(12) United States Patent
Franz (10) Patent No.: US 10,113,711 B2
(45) Date of Patent: Oct. 30, 2018

(54) ASSEMBLY FOR PRODUCING A PLURALITY OF BEAM BUNDLES

(71) Applicant: NOVA MEASURING INSTRUMENTS LTD., Rehovot (IL)

(72) Inventor: Stefan Franz, Jena (DE)

(73) Assignee: NOVA MEASURING INSTRUMENTS LTD., Rehovot (IL)

( * ) Notice: Subject to any disclaimer, the term of this patent is extended or adjusted under 35 U.S.C. 154(b) by 0 days.

(21) Appl. No.: 15/038,081

(22) PCT Filed: Nov. 20, 2014

(86) PCT No.: PCT/EP2014/003103
§ 371 (c)(1),
(2) Date: May 20, 2016

(87) PCT Pub. No.: WO2015/074757
PCT Pub. Date: May 28, 2015

(65) Prior Publication Data
US 2016/0305632 A1    Oct. 20, 2016
US 2017/0292678 A9    Oct. 12, 2017

(30) Foreign Application Priority Data
Nov. 20, 2013 (DE) .......... 10 2013 019 659
Nov. 20, 2013 (DE) .......... 10 2013 019 664

(51) Int. Cl.
*F21V 7/10* (2006.01)
*F21V 7/06* (2006.01)
(Continued)

(52) U.S. Cl.
CPC ............. *F21V 7/10* (2013.01); *F21V 7/043* (2013.01); *F21V 7/045* (2013.01); *F21V 7/05* (2013.01); *F21V 7/06* (2013.01); *F21V 7/08* (2013.01)

(58) Field of Classification Search
CPC .. F21S 48/1352; F21S 48/1358; F21S 48/137; F21S 48/1376; F21S 41/321;
(Continued)

(56) References Cited

U.S. PATENT DOCUMENTS

| 1,651,984 | A |   | 12/1927 | Allen et al. | |
|---|---|---|---|---|---|
| 3,923,382 | A | * | 12/1975 | Harding | G02B 5/10 250/353 |
| 4,050,775 | A | * | 9/1977 | Scholten | G02B 17/0668 359/728 |
| 4,153,929 | A | * | 5/1979 | Laudenschlarger | F21V 7/08 359/851 |

(Continued)

FOREIGN PATENT DOCUMENTS

DE    102012202290 A1    8/2013

OTHER PUBLICATIONS

Ausain-Abidi et al., Fourier Transformable Properties of Paraboloidal Mirror Segments, Optics Communication, 3(6):409-411 (1971).

*Primary Examiner* — Hargobind S Sawhney
(74) *Attorney, Agent, or Firm* — Browdy and Neimark, PLLC (57) ABSTRACT

A mirror assembly is provided for producing beam bundles from the beam of a light source, wherein the beam bundles includes a first beam bundle having a first main beam direction, a second beam bundle having a second main beam direction, and preferably further beam bundles having further main beam directions. The assembly includes a first mirror segment having a first focal point, which converts a first partial region of the beam of the light source into the first beam bundle, a second mirror segment having a second focal point, which converts a second partial region of the beam of the light source into the second beam bundle, and preferably further mirror segments having further focal points, which convert further partial regions of the beam of the light source into further beam bundles. The back side of the mirror segments have a curvature which is concentric to the light source.

19 Claims, 7 Drawing Sheets

(51) Int. Cl.
*F21V 7/04* (2006.01)
*F21V 7/08* (2006.01)
*F21V 7/05* (2006.01)

(58) Field of Classification Search
CPC ........ F21S 41/336; F21S 41/337; F21S 43/14;
F21V 7/041; F21V 7/045; F21V 7/09;
F21V 7/0058; F21V 7/0091; F21V 7/04;
F21V 7/043; F21V 7/06; F21V 7/08;
F21V 7/10; G02B 5/09; G02B 5/10;
G02B 7/1822; G02B 27/0983; G02B
27/143; F21Y 2101/00; F21Y 2103/10
See application file for complete search history.

(56) References Cited

U.S. PATENT DOCUMENTS

| | | | |
|---|---|---|---|
| 4,188,657 A * | 2/1980 | Reibling | F21V 7/22 |
| | | | 362/348 |
| 6,225,551 B1 * | 5/2001 | Lewandowski | F24J 2/10 |
| | | | 126/689 |
| 8,801,248 B2 | 8/2014 | Brendle | |
| 2004/0136196 A1 * | 7/2004 | Akiyama | B60Q 1/2607 |
| | | | 362/487 |
| 2005/0078483 A1 * | 4/2005 | Bernard | F21V 7/0058 |
| | | | 362/327 |
| 2007/0285797 A1 | 12/2007 | Osetinsky | |
| 2008/0175015 A1 * | 7/2008 | Goncalves | F21S 48/20 |
| | | | 362/518 |
| 2010/0039824 A1 * | 2/2010 | Wang | B60Q 1/0052 |
| | | | 362/310 |

\* cited by examiner

ASSEMBLY FOR PRODUCING A PLURALITY OF BEAM BUNDLES

The invention relates to a mirror assembly for producing a plurality of beam bundles from the beam of a light source, and a process for manufacturing such an assembly, and an optical assembly for displaying the light source as advantageous application of the mirror assembly.

The prior art discloses assemblies for producing a plurality of beam bundles from a light source. In this prior art an off-axis paraboloid generates a collimated light bundle, from which with plane mirrors parts or partial areas can be deflected in other directions.

These solutions are not adequate for providing the increasing demands of such assemblies, in particular lighting systems which at the same time have a small footprint, have minimal manufacturing and material costs and which are characterised by the least possible number of optical elements. The installation space relief is necessary for example to arrange more optical elements for other optical functions. By way of example these other optical elements can be switchable screens and/or switchable polarizers. Such optical elements are used in so-called ellipsometers. Ellipsometry is a measuring method of material research and surface physics by which dielectric material properties and the layer thickness of thin layers can be determined.

Ellipsometry can be applied for examining various materials, for example organic or inorganic samples (metals, semi-conductors, insulators and also liquid crystals). Ellipsometry determines the change in the state of polarisation of light during reflection (or transmission) on a sample.

For such use the change of the polarisation state by additional mirrors also has a disruptive effect. It is also necessary with the measuring method of ellipsometry that several measuring beams, for example three measuring beams, have to be recombined very precisely on a sample, for example a wafer or other object to be illuminated. But static (temperature drift, mechanical drift) and dynamic (vibrations) angle errors of each additional mirror further reduce the angle error of all optical elements. The service life of an optical system is further defined via a drop in transmission by all optical elements. This decrease is caused in particular in the case of short wavelengths by molecular contamination of mirror layers. The service life becomes all the greater the fewer optical elements contribute to this process. The aim of the invention therefore is to provide an assembly for producing a plurality of beam bundles, which overcomes these drawbacks. This task is solved by an assembly as per the features of Claim 1. Preferred embodiments are the subject matter of the respective dependent claims.

In a fundamental idea of the invention a mirror assembly for producing a plurality of beam bundles from the beam has a light source, whereby the plurality of beam bundles of at least a first beam bundle with a first main beam direction, a second beam bundle with a second main beam direction and preferably more beam bundles with more main beam directions has the following features: a first mirror segment with a first focal point, which converts a first partial area of the beam of the light source into the first beam bundle and a second mirror segment with a second focal point which converts a second partial area of the beam of the light source into the second beam bundle and preferably more mirror segments with more focal points, which convert more partial areas of the beam of the light source into more beam bundles, whereby the back side of the mirror segments has a curvature with the radius R_s, which is concentric to the light source.

In a preferred embodiment the mirror segments are configured as parabolic segments and the first parabolic segment converts the first partial area of the beam of the light source into a first collimated beam bundle and the second parabolic segment converts the second partial area of the beam of the light source into a second collimated beam bundle and the third parabolic segment converts a third partial area of the beam of the light source into a third collimated beam bundle. A light beam can easily be converted by this embodiment into a plurality of collimated beams or beam bundles, whereby these beams or beam bundles have a different main beam direction.

The word parabolic segment is also generally understood in this context as a mirror as a mirror which is corrected for a special optical task. A paraboloid converts the light of a point source ideally into a collimated beam. For other applications this mirror can have another form: with an ellipsoid the light of a point source can ideally be depicted in a point. With a spherical mirror a similar task can be solved as with a paraboloid or an ellipsoid. If the requirements for correction are less, both can also be done with spherical mirrors. The inventive idea can be even applied to plane mirrors and mirrors with other correcting properties.

In a preferred embodiment the mirror segments are configured as spherical segments and the first spherical segment converts the first partial area of the beam of the light source into a first beam bundle with a modified convergence and the second spherical segment converts the second partial area of the beam of the light source into a second beam bundle with modified convergence and the third spherical segment converts the third partial area of the beam of the light source into a third beam bundle with modified convergence.

In another preferred embodiment the mirror segments are configured as ellipsoid segments and the first ellipsoid segment converts the first partial area of the beam of the light source into a first focused beam bundle and the second ellipsoid segment converts the second partial area of the beam of the light source into a second focused beam bundle and the third ellipsoid segment converts the third partial area of the beam of the light source into a third focused beam bundle. A light beam can easily be converted into a plurality of light points by this embodiment, whereby these light points can be shown at various places.

In a more preferred embodiment are the mirror segments as plane mirror segments configured and the first plane mirror segment converts the first partial area of the beam of the light source into a first divergent beam bundle and the second plane mirror segment converts the second partial area of the beam of the light source into a second divergent beam bundle and the third plane mirror segment converts the third partial area of the beam of the light source into a third divergent beam bundle.

In another preferred embodiment the mirror segments are configured as free-form mirror elements and the first free-form mirror element converts the first partial area of the beam of the light source into a first specially corrected beam bundle and the second free-form mirror element converts the second partial area of the beam of the light source into a second specially corrected beam bundle and the third free-form mirror element converts the third partial area of the beam of the light source into a third specially corrected beam bundle.

In a more preferred embodiment the assembly also comprises a spherical shell segment or a cylindrical shell segment with the radius R_s, in which the mirror segments are arranged, whereby the individual mirror segments are connected to the spherical shell segment or cylindrical shell segment, in particular non-positively and/or positively. Such an embodiment makes it particularly easy to adjust the individual mirror segments.

In another preferred embodiment the mirror segments are parts of a common female part, whereby the female part has a working distance f relative to the light source at a point FP, with a vertex radius R_p, a back-side radius of curvature is R_s and a maximal thickness is D_max and the equation is D_max+R_p/2=R_s and the volume of the individual mirror segments is less than the volume of the female part.

The rear (back) side of the mirror segments is configured in particular as a spherical shell segment whenever beams are to be generated as defined and selectable in two spatial directions. In this case more special outer contours, straight guide edges for example, can make the adjustment easier.

If the beams to be produced span only one common plane, then the rear side of the mirror segments can also be a cylindrical shell segment which is set in a suitable load cylinder and adjusted. Then the outer contours are not need for fixing rotation of the segments about the optical axis.

An inventive design of the mirror verso enables advantageous use in the manufacture of multi-plane mirrors. Prisms are generally known for producing several beams from the light of one source by aperture division. Setting of the angle however is achieved as per the classic process of glass processing. Using the spherical or cylindrical rear side allows the angle to be adjusted precisely if necessary, as preferred for the short term. With a corresponding design the choice of angle can also first be in the specific application and then be ascertained permanently or detachably.

An advantage of the invention in general is also in the choice of paraboloids, ellipsoids or other freeform surfaces in that the known geometries of optical components can be used and producing several beams from one compact part requires no special technology for manufacturing mirrors.

It is clear to those skilled in the art that the inventive assembly can also be used in the opposite beam direction. In the embodiment with the parabolic segments several beam bundles from different directions can be focused on one point.

The invention also claims a process for manufacturing a mirror assembly for producing a plurality of beam bundles, whereby the process comprises the following features:

providing a first mirror segment, a second mirror segment and preferably more mirror segments;

providing a light source for sending out a beam;

arranging the mirror segments such that the first mirror segment converts a first partial area of the beam of the light source into a first beam bundle with a first main beam direction and the second mirror segment converts a second partial area of the beam of the light source into a second beam bundle with a second main beam direction and if needed more mirror segments convert more partial areas of the beam of the light source into more beam bundles with more main beam directions, whereby the back side of the mirror segments has a curvature with the radius R_s, which is concentric to the light source.

In another preferred embodiment the method comprises the step of providing a first mirror segment, a second mirror segment and if needed more mirror segments and the step of arranging the mirror segments following additional steps of:

providing a female part with a working distance f relative to the light source on a point FP, with a vertex radius R_p, a rear-side radius of curvature R_s and a maximal thickness D_max, satisfying a first equation R_p/2+D_max=R_s and a second equation R_p=2f gilt;

dividing the female part into at least a first, a second and if needed more mirror segments, whereby the volume of the first and second and if needed of more mirror segments is smaller than the volume of the female part;

providing a spherical shell segment or a cylindrical shell segment with a radius R_s, in which the mirror segments can be laid;

arranging the first mirror segment in the spherical shell segment or cylindrical shell segment;

arranging the second and if needed of more mirror segments in the spherical shell segment or cylindrical shell segment, whereby the arranging comprises rotation R of the second and if needed of more mirror segments about the point FP such that the second partial area of the beam of the light source is converted into a second beam bundle with a second main beam direction and if needed more partial areas of the beam of the light source are converted into more beam bundle with more main beam directions.

In another preferred embodiment the step of dividing the female part comprises dividing it into third segments, whereby at least a first, a second and a third mirror segments are cut out of the three third segments in each case. Such dividing can also save on material.

In another preferred embodiment the beam bundles are measured by a receiver and the step of rotation of the second and if needed of more mirror segments is conducted by way of measuring signals of the receiver. The corresponding angle between the main beam directions can be adjusted by means of measuring.

In another preferred embodiment the mirror segments have an outer contour with straight edges. In another preferred embodiment the mirror segments have straight edges which lie flush or parallel in pairs so that these edges can be used as a guide in the step of rotation in the spherical shell segment or cylindrical shell segment.

In another preferred embodiment the straight edges of mirror segment pairs enclose a defined angle of preferably 90°, which can also be shown in a device for assembling.

It is understood that the abovedescribed embodiments can be depicted in a unique position or in combination. A preferred embodiment comprises an 'and/or' link between a first feature and a second feature, so the outcome is that the embodiment has both the first feature and the second feature and as per another embodiment either the first feature only or the second feature only.

Advantageous embodiments of the present invention are explained in more detail hereinbelow with reference to the figures, in which.

In the following description of favourable embodiments of the present invention identical or similar reference numerals are used for the elements illustrated in the various figures, which act the same, whereby repeated description of these elements is omitted.

Figure 1:
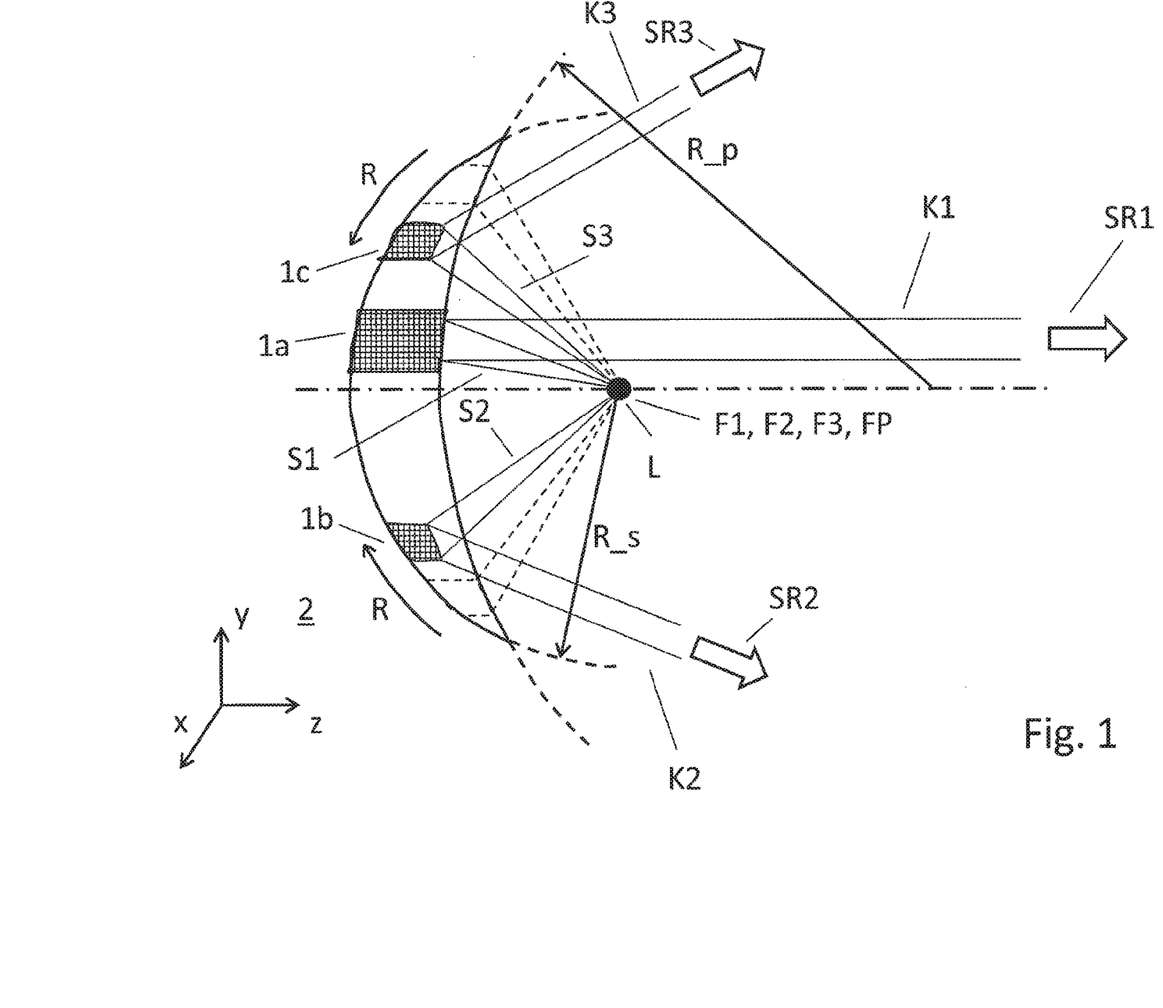
FIG. 1 illustrates a schematic configuration of a first embodiment of an inventive assembly for producing a plurality of beam bundles.

FIG. 1 shows a schematic configuration of a first embodiment of an inventive assembly for producing a plurality of beam bundles. Such an assembly can be used for example in an ellipsometer, as will be described in more detail hereinbelow. The illustrated embodiment shows a so-called triple collimator. Such a collimator has three collimated beam bundles K1, K2 and K3, whereby these beam bundles are deflected by the inventive configuration into three different main beam directions SR1, SR2 and SR3.

The beam bundles K1, K2 and K3 originate from a common light source L, whereby the light source in this embodiment is an optic fibre, from which a light cone exits. The light cone exiting from the light source L, also designated as beam as per the invention, is reflected on three mirror segments 1a, 1b and 1c. So a first partial area of the beam S1 is converted into a first collimated beam bundle K1, a second partial area of the beam S2 is converted into a second collimated beam bundle K2 and a third partial area of the beam is converted into a third collimated bean bundle K3.

Figure 2:
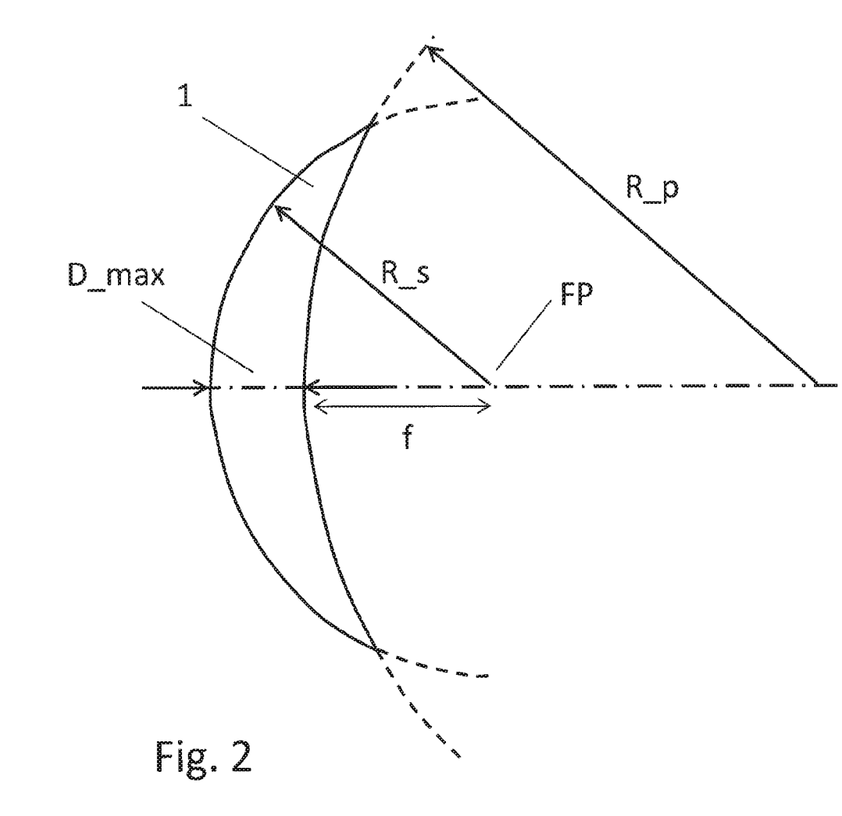
FIG. 2 illustrates a schematic configuration of an inventive female part.
Figure 3:
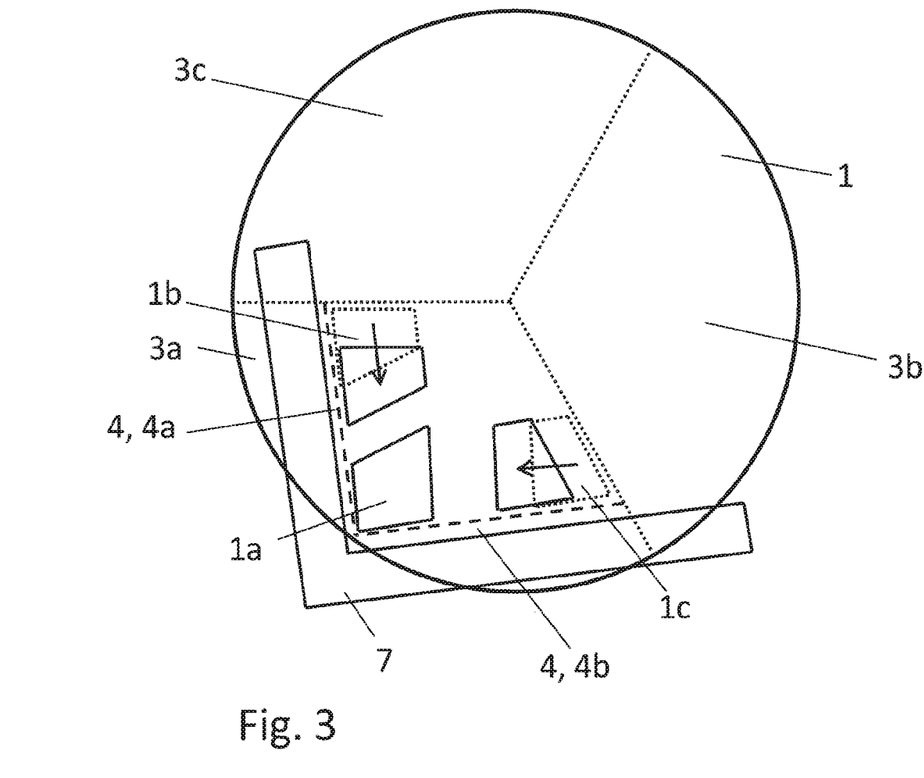
FIG. 3 illustrates a schematic representation of the process sequence for producing inventive parabolic segments.

With reference to FIG. 2 and FIG. 3 the manufacturing of the individual mirror segments 1a, 1b and 1c will now be described in more detail.

The start point of manufacturing the individual mirror segments is an optical element designated according to the invention as a female part 1. The female part has a vertex radius $R\_p$ and a rear radius of curvature $R\_s$. The maximal thickness of the female part is $D\_max$, whereby the thickness reduces continuously to the edges of the female part. These equations apply to the female part:

$$D\_max + R\_p/2 = R\_s \text{ and} \tag{1}$$

$$R\_p = 2f, \tag{2}$$

whereby f is the focal length of the female part and FP constitutes the focal point of the female part. The corresponding sizes are shown in FIG. 2. For a collimated beam bundle to be produced the mirror segments are designed as parabolic segments.

A solution as per the prior art for configuration of a group of three parabolic segments comprises adjusting each segment such that it fulfils its optical function individually and ensuring that the angle between the collimated beam bundles or respectively the preferred beam direction of the collimated beam bundles is produced correctly. For this a minimum number of degrees of liberty or respectively closely tolerated form elements is needed.

A light source must be in the focal point of all parabolic segments. For three parabolic segments three points must be brought to congruence. One segment simulates the point. Both other segments must be adjusted to the latter. A total of six degrees of liberty results for both other points with coordinates $(x\_i, y\_i, z\_i)$. The collimated beams are also to run in three beam directions. One parabolic segment simulates a direction. The other two segments must be adjusted to the latter. The beam direction can be represented depending on two angles alpha and beta giving that the equation $SR = SR(\alpha, \beta)$. Four more degrees of liberty result for the two other beam directions so that a total of ten degrees of liberty is to be acknowledged and adjusted.

The invention is based on this prior art, in that it reduces the number of degrees of liberty and simplifies adjusting of the individual parabolic segments.

In a first procedural step the female part 1 is divided into parabolic segments 1a, 1b and 1c. The individual parabolic segments are then arranged in a spherical shell segment or a spherical shell 2 with the radius $R\_s$. The first parabolic segment with the focal point F1 sets the position of the light source L in this focal point. Rotation R of another parabolic segment about the common focal point FP results in a change in beam direction of the collimated beam bundles. Such a change in direction of the collimated beam direction is shown in FIG. 1. In the embodiment as per FIG. 1 a second parabolic segment 1b and a third parabolic segment 1c from a first position (dashed line) is rotated in a second position about the common focal point FP so that the beam directions SR2 and SR3 change relative to the beam direction SR1. Such a process in each case omits three degrees of liberty for the second parabolic segment 1b and the third parabolic segment 1c.

Strictly speaking, such a procedure guarantees via the spherical shell 2 only the degree of liberty in the z direction. The condition of rotation R about the common focal point FP must still be ensured. This condition is ensured by means of an adjusting device or respectively a device for assembling 7, as will be explained in more detail by way of FIG. 3 hereinbelow.

By way of FIG. 3 the process sequence for manufacturing an assembly for producing a plurality of collimated beam bundles will be specified in more detail. The starting point of the process is a female part 1, which as per this embodiment in a first procedural step is disassembled into three identically sized third segments 3a, 3b and 3c. The female part is shown in FIG. 3 in a plan view. In the following only the third segment 3a will be explained further, since the following procedural steps are identical for the other third segments.

In a second procedural step two straight cuts 4a and 4b are made on the third segment 3a, which enclose an angle of 90°. In a third procedural step the three parabolic segments 1a, 1b and 1c are excised and arranged in the spherical shell or the spherical shell segment 2. In a fourth procedural step the parabolic segments are shifted by means of the adjusting device 7 along the common edges 4a, 4b, so that the preferred angle or respectively the preferred beam direction SR1 and SR2 is set. Shifting the parabolic segments 1b and 1c corresponds to rotation R about the common focal point FP, as per FIG. 1.

Figure 4:
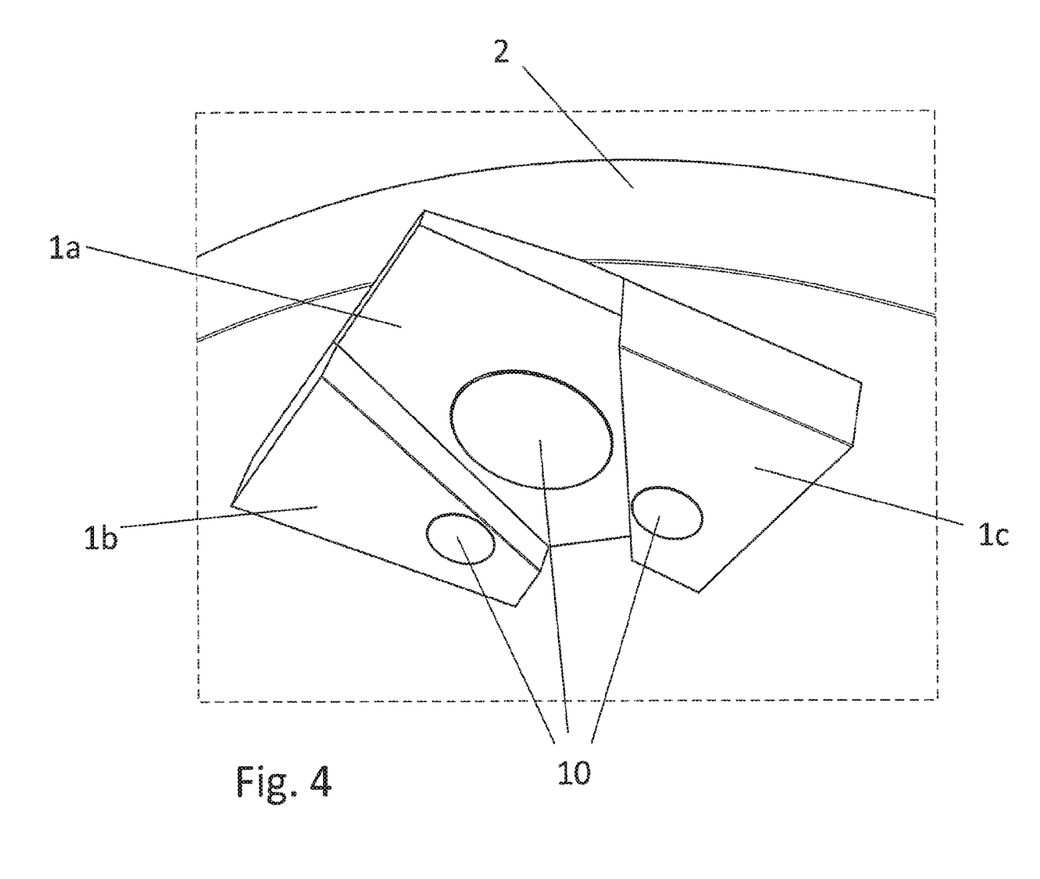
FIG. 4 illustrates a perspective view of inventive parabolic segments.
Figure 5:
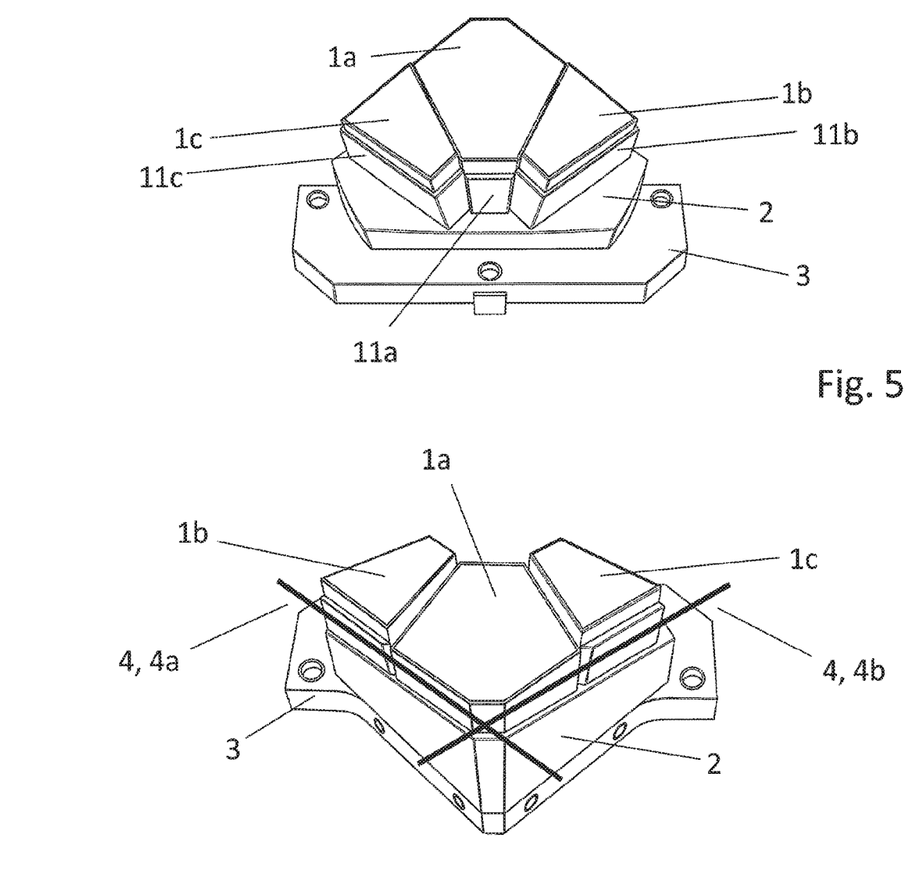
FIG. 5 illustrates a further perspective view of inventive parabolic segments.

FIG. 4 and FIG. 5 show the individual parabolic segments 1a, 1b and 1c in the assembled state in the spherical shell 2 and also the optically used areas 10. The spherical shell 2 can also be connected to another base plate 3. Also, the component can have more form elements 11a, 11b and 11c for mounting and more stabilising.

Figure 6:
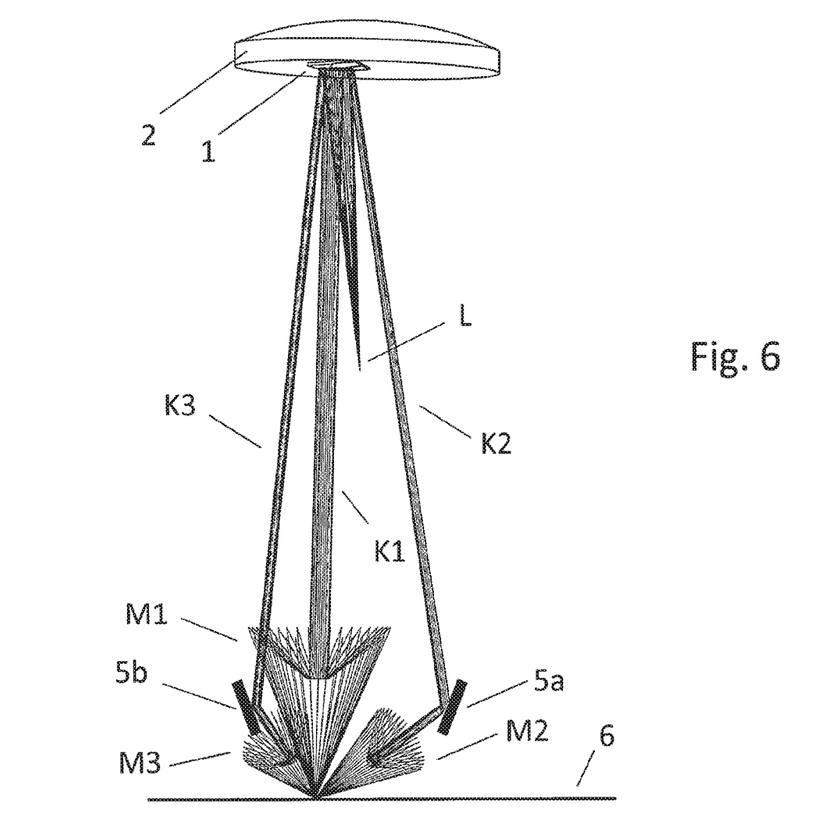
FIG. 6 illustrates a schematic configuration of an inventive ellipsometer.

FIG. 6 shows a schematic configuration of an inventive ellipsometer as embodiment of an optical assembly. The ellipsometer is housed in a housing, not shown in more detail here. FIG. 6 clearly illustrates the whole beam path which starts out from a light source L. Partial areas of the beam are converted into collimated beam bundles K1, K2 and K3 by means of the inventive assembly 1. The beam bundles K2 and K3 are reflected on mirrors 5a and 5b and then deflected to a sample 6, for example a wafer. Specific information can be determined by the sample by means of the measuring radiation M1, M2 and M3 reflected on the sample 6.

Figure 7:
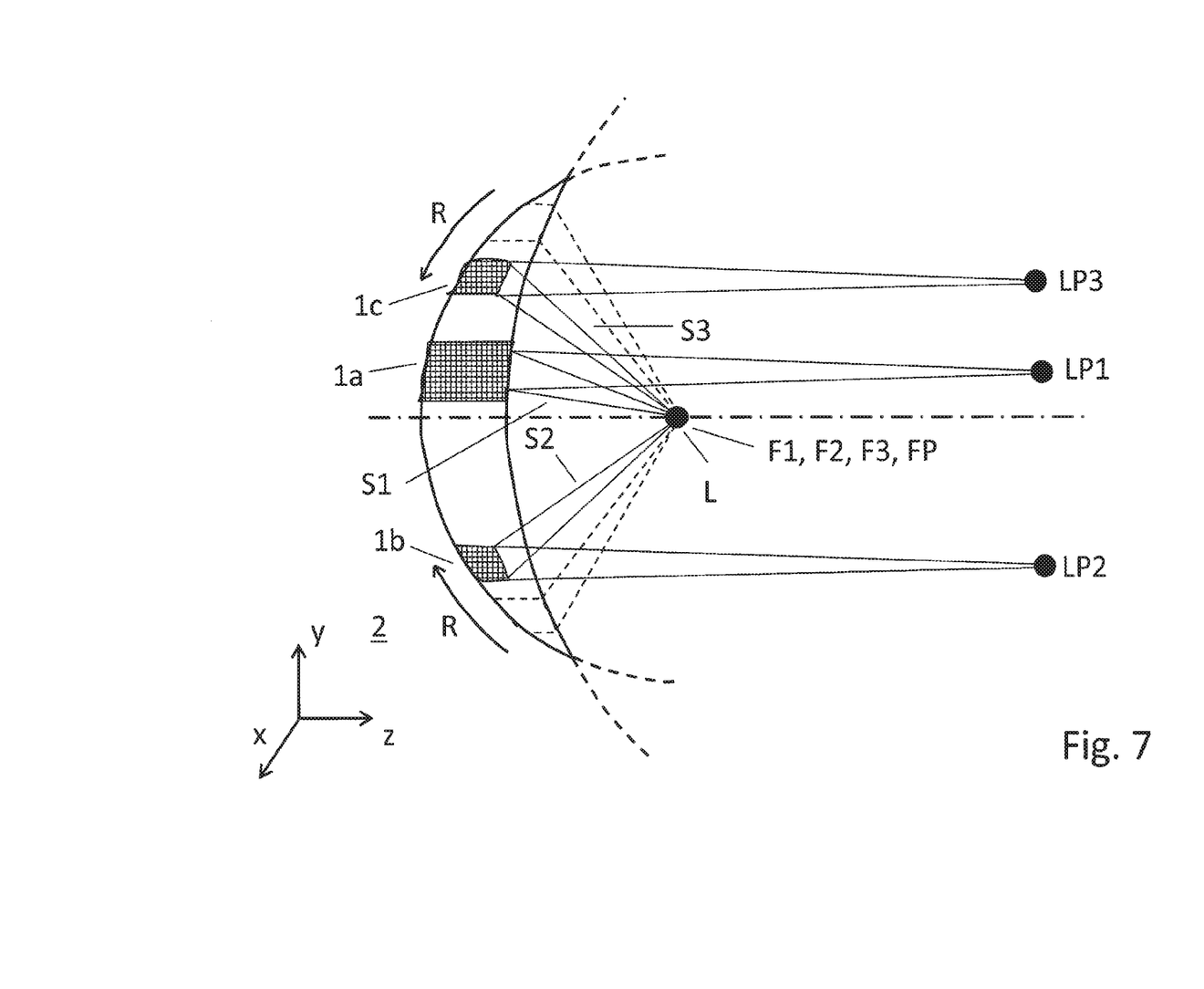
FIG. 7 illustrates a schematic configuration of a second embodiment of an inventive assembly for producing a plurality of light points.

FIG. 7 shows a schematic configuration of a second embodiment of an inventive assembly for producing a plurality of light points. Partial areas S1, S2 and S3 of a beam of a light source L are displayed in the light points LP1, LP2 and LP3 by means of ellipsoid segments 1a, 1b and 1c.

The invention claimed is:

1. A mirror assembly (1) for producing a plurality of beam bundles (K1, . . . Kn) having main beam directions (SR1 . . . SRn) from a beam of a light source (L), wherein n≥2, the mirror assembly comprising:
    a plurality of mirror segments (1a . . . 1n) with corresponding focal points (F1 . . . Fn), wherein said focal points (F1 . . . Fn) convert a corresponding partial area (S1 . . . Sn) of the beam of the light source (L) into corresponding beam bundle (K1 . . . Kn), whereby the rear side of the mirror segments has a curvature with the radius R_s, which is concentric to the light source, wherein said mirror segments are parts of a common female part (1), whereby the female part has a working distance f relative to the light source at a point (FP), with a vertex radius (R_p), a rear-side radius of curvature (R_s) and a maximal thickness (D_max) satisfying a condition that D_max+R_p/2=R_s, and the volume of the individual mirror segments is smaller than the volume of the female part.

2. The mirror assembly as claimed in claim 1, wherein said mirror segments (1a, . . . 1n) are configured as parabolic segments converting the partial area of the beams (S1, . . . Sn) of the light source into collimated beam bundles (K1, . . . Kn) respectively.

3. The mirror assembly as claimed in claim 1, wherein said mirror segments (1a, . . . 1n) are configured as spherical segments converting the partial area of the beams (S1, . . . Sn) of the light source into beam bundles (K1, . . . Kn) respectively with modified convergence.

4. The mirror assembly as claimed in claim 1, wherein said mirror segments (1a, . . . 1n) are configured as ellipsoid segments converting the partial area of the beams (S1, . . . Sn) of the light source into focused beam bundles (K1, . . . Kn) respectively.

5. The mirror assembly as claimed in claim 1, wherein said mirror segments (1a, . . . 1n) are configured as plane mirror segments converting the partial area of the beams (S1, . . . Sn) of the light source into divergent beam bundles (K1, . . . Kn) respectively.

6. The mirror assembly as claimed in claim 1, wherein said mirror segments (1a, . . . 1n) are configured as free-form mirror elements converting the partial area of the beams (S1, . . . Sn) of the light source into specially corrected beam bundles (K1, . . . Kn) respectively.

7. The mirror assembly as claimed in claim 1, further comprising a spherical shell segment (2) with the radius R_s, in which the mirror segments are arranged, whereby the individual mirror segments with the spherical shell segment, in particular non-positively and/or positively, are connected.

8. The mirror assembly as claimed claim 1, further comprising a cylindrical shell segment (2) with the radius R_s, in which the mirror segments are arranged, whereby the individual mirror segments are connected to the cylindrical shell segment non-positively and/or positively.

9. A process for manufacturing a mirror assembly, the mirror assembly comprising a plurality of mirror segments (1a . . . 1n) with corresponding focal points (F1 . . . Fn), wherein said focal points (F1 . . . Fn) convert a corresponding partial area (S1 . . . Sn) of the beam of the light source (L) into corresponding beam bundle (K1 . . . Kn), whereby the rear side of the mirror segments has a curvature with the radius R_s, which is concentric to the light source, wherein the process comprises:
    providing a plurality of mirror segments (1a, . . . 1n), where n≥2;
    providing a light source (L) for sending out a beam (S);
    arranging said mirror segments (1a, . . . 1n) such that they convert partial areas of the beams (S1, . . . Sn) of the light source into beam bundles (K1, . . . Kn) with main beam directions (SR1, . . . SRn) respectively, whereby the rear side of the mirror segments has a curvature with the radius R_s, which is concentric to the light source, wherein said providing of said mirror segments (1a, . . . 1n) and the step of arranging the mirror segments (1a, . . . 1n) comprise the following:
    providing a female part (1) with a working distance f relative to the light source at a point (FP), with a vertex radius (R_p), a rear-side radius of curvature (R_s) and a maximal thickness (D_max), satisfying a first equation is R_p/2+D_max=R_s and a second equation is R_p=2f;
    dividing the female part in mirror segments, whereby the volume of the mirror segments is smaller than the volume of the female part;
    providing a spherical shell segment or a cylindrical shell segment with a radius R_s, in which the mirror segments can be laid;
    arranging each of said mirror segments in spherical shell segment or cylindrical shell segment; whereby the arranging step comprises rotation (R) of the at least one of said mirror segment about the point (FP), such that at least one partial area of the beam of the light source is converted into a respective at least one beam bundle with a respective at least one main beam direction.

10. The process as claimed in claim 9, wherein the step of dividing the female part comprises disassembling into a plurality of third segments (3a, . . . 3n) and cutting said mirror segments (1a, . . . 1n) out of the third segments in each case.

11. The process as claimed in claim 9, wherein the beam bundles (K1 . . . Kn) are measured by means of a receiver, and rotation (R) of the at least one of the mirror segments is completed by way of measuring signals from the receiver.

12. The process as claimed in claim 9, wherein the mirror segments have an outer contour with straight edges (4a, 4b).

13. The process as claimed in claim 12, wherein the mirror segments have straight edges which lie flush in pairs or in parallel so that these edges can be used as a guide in the step of rotation (R) in the spherical shell segment or cylindrical shell segment.

14. The process as claimed in claim 13, wherein the straight edges of mirror segment pairs enclose a defined angle of substantially 90°, which can also be shown in a device for assembling (7).

15. A process for manufacturing a mirror assembly, the mirror assembly comprising a plurality of mirror segments (1a . . . 1n) with corresponding focal points (F1 . . . Fn), wherein said focal points (F1 . . . Fn) convert a corresponding partial area (S1 . . . Sn) of the beam of the light source (L) into corresponding beam bundle (K1 . . . Kn), whereby the rear side of the mirror segments has a curvature with the radius R_s, which is concentric to the light source, wherein the process comprises the following features:
    providing a plurality of mirror segments (1a, . . . 1n), where n≥2;

providing a light source (L) for sending out a beam (S);

arranging said mirror segments ($1a, \ldots 1n$) such that they convert partial areas of the beams ($S1, \ldots Sn$) of the light source into beam bundles ($K1, \ldots Kn$) with main beam directions ($SR1, \ldots SRn$) respectively, whereby the rear side of the mirror segments has a curvature with the radius $R\_s$, which is concentric to the light source, wherein the beam bundles ($K1 \ldots Kn$) are measured by means of a receiver, and rotation (R) of the at least one of the mirror segments is completed by way of measuring signals from the receiver.

16. The process as claimed in claim 15, wherein the step of providing said mirror segments ($1a, \ldots 1n$) and the step of arranging the mirror segments ($1a, \ldots 1n$) comprise the following:

providing a female part (1) with a working distance f relative to the light source at a point (FP), with a vertex radius ($R\_p$), a rear-side radius of curvature ($R\_s$) and a maximal thickness ($D\_max$), satisfying a first equation is $R\_p/2 + D\_max = R\_s$ and a second equation is $R\_p = 2f$;

dividing the female part in mirror segments, whereby the volume of the mirror segments is smaller than the volume of the female part;

providing a spherical shell segment or a cylindrical shell segment with a radius $R\_s$, in which the mirror segments can be laid;

arranging each of said mirror segments in spherical shell segment or cylindrical shell segment; whereby the arranging step comprises rotation (R) of the at least one of said mirror segment about the point (FP), such that at least one partial area of the beam of the light source is converted into a respective at least one beam bundle with a respective at least one main beam direction.

17. The process as claimed in claim 15, wherein the mirror segments have an outer contour with straight edges (4a, 4b).

18. The process as claimed in claim 17, wherein the mirror segments have straight edges which lie flush in pairs or in parallel so that these edges can be used as a guide in the step of rotation (R) in the spherical shell segment or cylindrical shell segment.

19. The process as claimed in claim 18, wherein the straight edges of mirror segment pairs enclose a defined angle of substantially 90°, which can also be shown in a device for assembling (7).

* * * * *